April 24, 1956 F. L. McCULLOCH 2,742,852
CITRUS FRUIT JUICE EXPRESSING MACHINE
Filed April 21, 1953 4 Sheets-Sheet 1
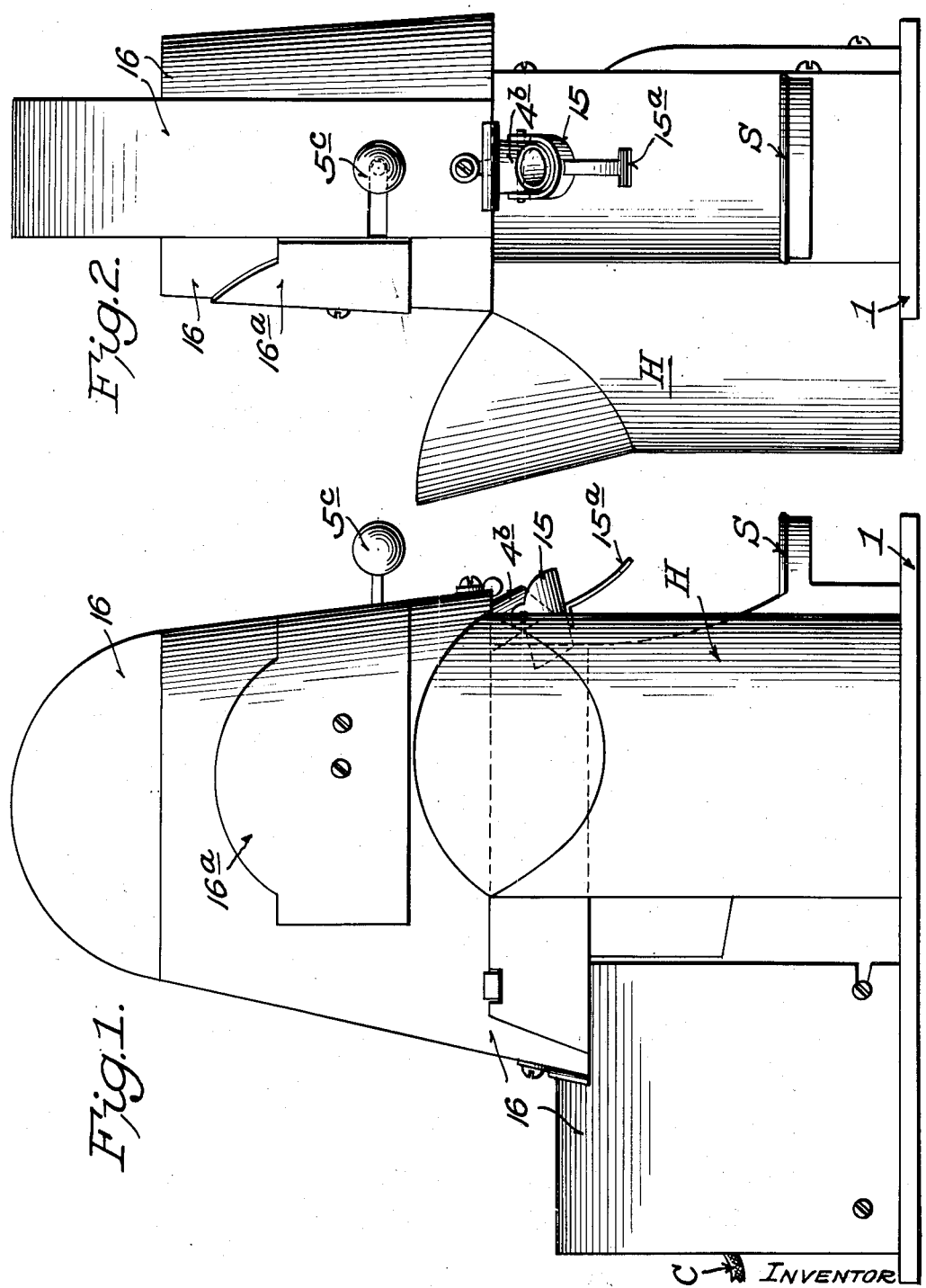
INVENTOR
Frederick L. McCulloch
BY
Alexander Dowell ATTORNEYS

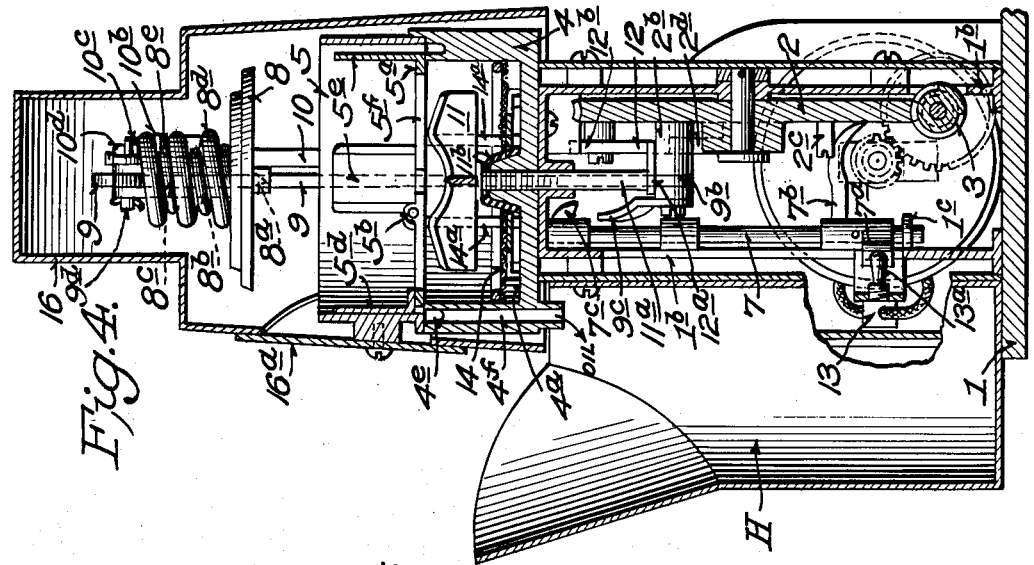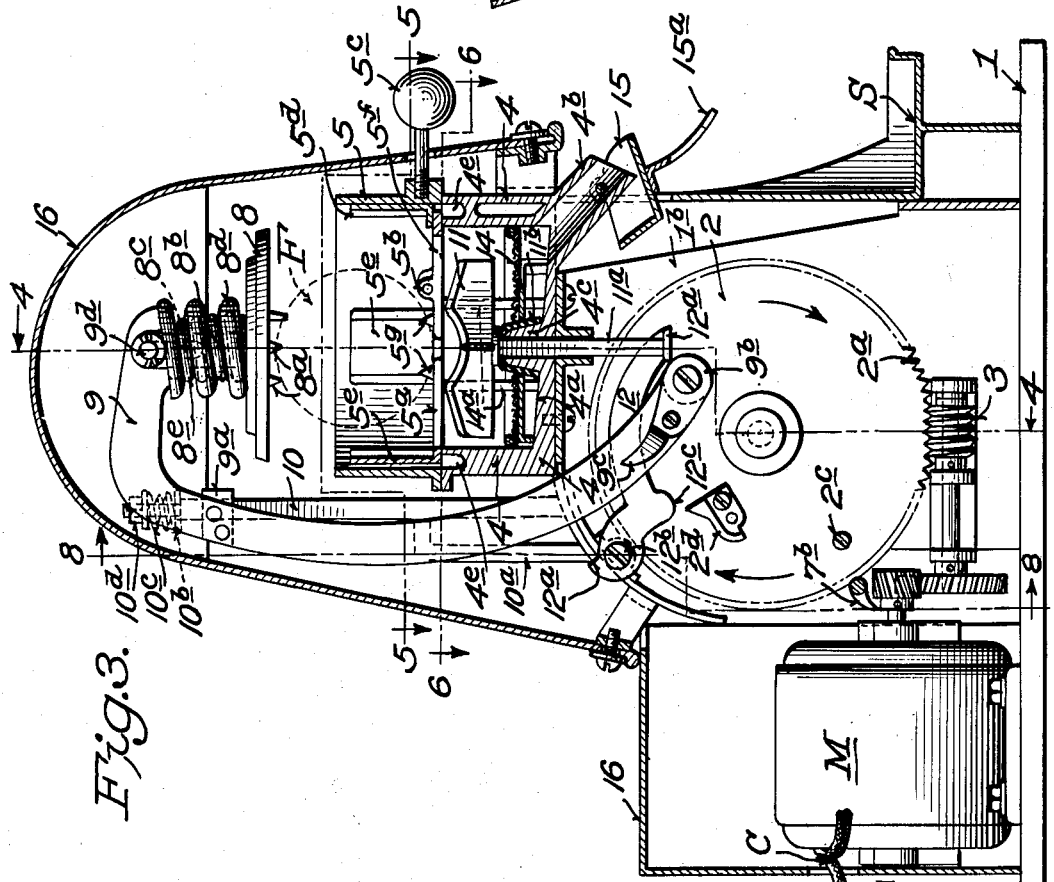

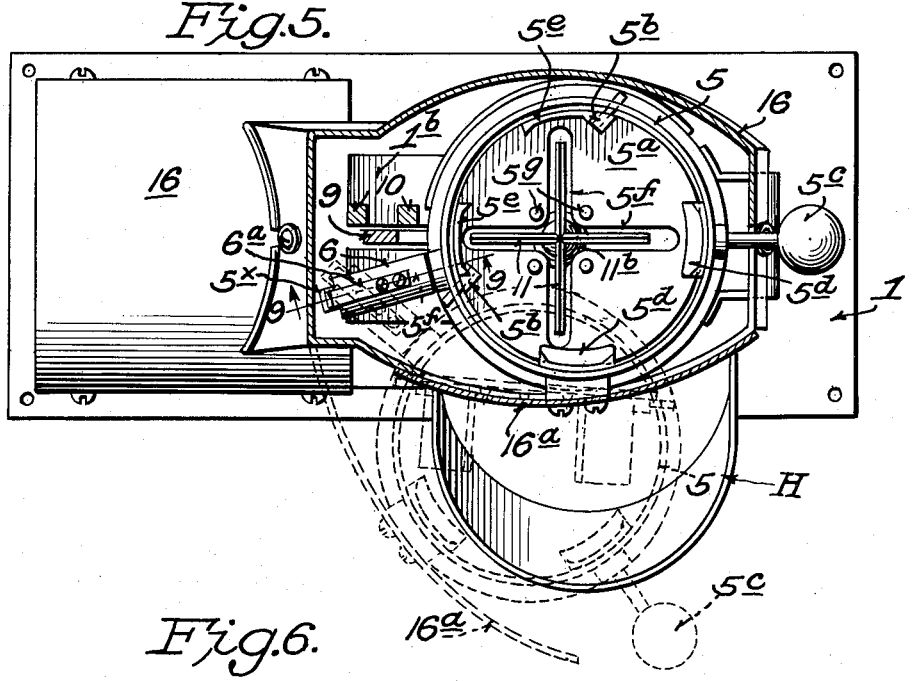

April 24, 1956  F. L. McCULLOCH  2,742,852
CITRUS FRUIT JUICE EXPRESSING MACHINE
Filed April 21, 1953  4 Sheets-Sheet 4

INVENTOR
Frederick L. McCulloch
BY Alexander & Dowell
ATTORNEYS

United States Patent Office 2,742,852
Patented Apr. 24, 1956

2,742,852

CITRUS FRUIT JUICE EXPRESSING MACHINE

Frederick L. McCulloch, Tampa, Fla.

Application April 21, 1953, Serial No. 350,112

20 Claims. (Cl. 100—53)

My invention relates to improvements in fruit juicing machines of the type characterized by the performance of a related series of functions which are timed to occur in the following sequence: The fruit is placed in the squeezing cup, which cup is closed manually to lie below a pressure element. The closing of the cup automatically sets in motion a power-driven cam wheel, which wheel, through appropriate linkages, causes the pressure element to descend into the cup to trap the fruit therein and to express the juice therefrom. At the same time the cam wheel causes a knife to project upwardly through the bottom of the cup and slit the fruit at the approximate moment when the pressure element begins to apply squeezing action thereto. After the fruit has been squeezed and the juice has passed through the bottom of the cup to a separate destination through a suitable chute, the pressure element moves upwardly and out of the cup and the cup is automatically thrown open to dump the squeezed carcass or hull into a suitable container. The machine is timed to be automatically shut off after the squeezed hull has been dumped and after the cup has returned to its initial position, ready to receive the next charge of fruit.

The above sequence of operation is characteristic of the present invention.

The principal object of the present invention is to provide a new operating and dumping mechanism wherein, as the cup containing the squeezed hull is thrown outwardly, the bottom plate of the cup pivots downwardly to a substantially vertical position above the hull-receiving container, the walls of the cup remaining in their normal vertical position. The downward pivoting of the bottom plate of the cup causes the hull to drop into the hull-receiving container. Subsequent to this dumping operation, the cup begins to travel inwardly again toward the pressure element, the bottom plate is automatically returned to its horizontal position and the cup is stopped in a position outwardly of the pressure element, preparatory to receiving the next charge of fruit.

Another very important object of my invention is to provide a machine of the character described, which machine is completely enclosed by appropriate housing covers whereby the hands of the operator are completely protected from injury since, when the squeezing cup is in the squeezing position and the plunger descends thereinto, the housing covers are completely closed so that the hands of the operator cannot be crushed by the powerful operation of the juicer.

A further important object of my invention is to provide automatically operated electric switch means, the operation of which means is controlled by the position of the squeezing cup, i. e., the machine is automatically turned on when the cup is moved to closed position, and the machine is automatically shut off when the cup reaches its open loading position after the squeezing and dumping operations.

A further object of my invention is to provide an adjustable means for controlling the amount of coasting the mechanism does after the motor has been shut off so that the machine will always come to rest in the correct position for the convenient insertion of a new charge of fruit.

Still another object of my invention is the provision of a squeezing machine of such design that the juice of the fruit is kept separate from any oil which may be expressed from the skin, the juice and the oil being delivered to separate destinations.

Other objects and advantages of the present invention will become apparent during the detailed discussion of the drawings wherein I will also set forth the description of the improved cam wheel operating mechanism.

In the drawings:

Figure 1 is a side elevation of my improved juicing machine.

Fig. 2 is a front elevation of the juicing machine showing the hull-receiving receptacle mounted in place at the side thereof.

Fig. 3 is a sectional elevation corresponding to the view shown in Fig. 1, the section being vertical and being taken through the center of the squeezing cup.

Fig. 4 is a sectional view taken along line 4—4 of Fig. 3.

Fig. 5 is a sectional view taken along line 5—5 of Fig. 3.

Fig. 6 is a sectional view taken along line 6—6 of Fig. 3.

Fig. 7 is a front elevation corresponding to Fig. 2 but showing the cup in open dumping position above the hull-receiving receptacle.

Fig. 8 is a sectional view taken along line 8—8 of Fig. 3 but showing only the operating mechanism, the covers having been removed.

Fig. 9 is a sectional view taken along line 9—9 of Fig. 5.

Referring now to the drawings and particularly to the section views shown in Figs. 3 and 4, the juicing machine comprises a pedestal 1 upon which is mounted a suitable drive motor M. Above the approximate center of the pedestal 1 is rotatably mounted a large cam wheel 2 having teeth 2a around its outer periphery, the teeth 3a engaging a worm gear 3 driven through suitable gearing by the motor M. Above the cam wheel 2 and slightly forward of the axis thereof is rigidly mounted a juice-receiving bowl 4, the bowl having a downwardly and forwardly tapered bottom 4a terminating at its forward end in a chute 4b, the chute being adapted to deliver the fruit juice to a tumbler (not shown), which tumbler is normally supported on a shelf S. The bowl 4 has an upstanding boss 4c located at the center thereof, which boss has a vertically disposed central bore therethrough for the purpose hereinafter described.

Above the bowl 4 is the fruit squeezing cup 5, which cup is shown in Figs. 3 and 4 in its closed or squeezing position. As shown in Figs. 5 and 9, the cup 5 is supported on a stud 5x which extends rearwardly therefrom into a sleeve 6 which is fixed to the top of pivot bar 7. On the top of the sleeve 6 is secured a spring clip 6a having a downwardly-extending tongue 6b which normally is engaged in the transverse slot 5y in the stud 5x, the tongue 6b normally retaining the stud 5x fixed within the sleeve 6, though permitting its release for withdrawal from the sleeve 6 when the spring 6a is pivoted upwardly to disengage the tongue 6b from the slot 5y, the above stud and sleeve arrangement providing the support for the squeezing cup and the spring 6a providing a quick releasing means whereby the squeezing cup may be easily removed from the machine for cleaning purposes.

As shown in Figs. 4 and 8, the pivot bar 7 is pivotally mounted in bearings 1c, which bearings are fixed to the frame 1b mounted on the pedestal 1.

Above the squeezing cup 5 (when in closed position) is located the pressure element 8 supported at its upper end on the arm 9. The arm 9 carries a collar 9a having a bore therethrough, which collar is slidably supported at its bore on a vertically-disposed guide 10, as shown in Fig. 3, the guide 10 being bifurcated along its lower portion to provide a pair of supporting legs 10a, which legs are rigidly fixed to the frame 1b.

The lower end of the arm 9 is rotatably fixed to a boss 2b as at 9b, the boss 2b being disposed off-center with respect to the axis of the cam wheel 2, so that as the cam wheel is rotated by drive from the motor M, the pivoted end 9b of the arm 9 performs a crank motion so that the collar 9a reciprocates up and down the guide 10, thereby imparting squeezing action to the pressure element 8.

As stated in the first paragraph of this specification, a reciprocating knife 11 is provided to slit the fruit as the pressure element 8 begins its squeezing action thereon. The knife 11 is mounted inside the bowl 4 and is supported on a knife shank 11a which extends downwardly through the bore in the boss 4c, the lower end of the knife shank 11a resting upon a foot 12a located at the outer end of the lever 12, which lever is pivotally supported at its inner end 12b by the frame 1b. The foot 12a is actuated in the manner hereinafter described to raise the knife shank 11a, and thereby cause the knives 11 to project upwardly into the fruit-squeezing cup at the appropriate moment in the timing of the rotation of the cam wheel 2, the knives 11 thereby slitting the fruit to permit expressing of the juice therefrom as the pressure element 8 begins its squeezing operation.

Having thus described in general terms the important elements of my juicing machine, I will proceed now to a more detailed discussion of the structure to bring out the exact manner in which this structure operates to perform efficient expressing of the juice of the fruit.

As shown in Fig. 6, the motor M receives electric current from the standard plug and cable C, the supply of which current, however, is controlled by the switch 13 which is supported by the frame 1b and which switch has an inwardly-extending toggle arm 13a. The switch is so located that the toggle arm pivot is opposite the pivot bar 7 which bar carries a bifurcated operator 7a surrounding the toggle 13a so that as the pivot bar is rotated counter-clockwise, as shown in Fig. 6, by the manual closing of the squeezing cup 5, the toggle 13a is moved to the right to close the switch and energize the motor M. Conversely, when the cup 5 is moved to the open position in the manner described hereinafter, and the pivot bar 7 is rotated clockwise, the toggle 13a is moved to the left, thereby opening the switch 13 and shutting off the motor M.

To prevent jamming of the mechanism in the event that the cup should be moved only part way to closed position and the motor should be energized when the cup 5 is more fully aligned with the bowl 4, the pivot bar 7 is provided with a closing finger 7b, Figs. 4 and 8, said closing finger 7b extending inwardly in the direction of the cam wheel 2 upon which is fixed an outwardly-extending stud 2c.

As shown in Fig. 3, the cam wheel rotates clockwise from its initial position so that the stud 2c initially moves leftwardly. If the cup 5 is in its entirely closed position, i. e. aligned with the bowl 4, the closing finger 7b will not be contacted by the stud 2c as the cam wheel begins to rotate; however, if the cup is not in completely closed position, the closing finger 7b will be oriented further to the right, in Fig. 3, so that as the cam wheel begins to rotate the stud 2c will contact the closing finger 7b causing the finger to move to the left and rotate the pivot bar 7 to bring the cup 5 into completely closed position.

The cam wheel 2 is further provided with a cam 2d, which cam is so located on the wheel 2 as to contact the lever 12 at the surface 12c just after the cam wheel is set in motion by the initial manual closing of the squeezing cup 5. It is to be noted that as the cam wheel begins to rotate and the cam 2d approaches the lever surface 12c, the lower pivoted end of the arm 9b is also being rotated in a clockwise downward direction, so that the pressure element 8 is being lowered against the fruit F, shown in dotted lines within the cup 5 in Fig. 3.

The timing is such that the pressure element 8 will have contacted the fruit F and will have begun to compress the same downwardly when the cam 2d arrives at the surface 12c. Upon further rotation of the cam wheel 2, the cam 2d will impart a rapid rising motion to the lever 12 at the surface 12c, the amplitude of which rising motion will be considerably amplified at the foot 12a so that the knife shank 11a and therefore the knives 11 will be projected rapidly up into the fruit F to cut X-shaped slits therein. As soon as the cam wheel 2 has rotated far enough so that the cam 2d has passed beyond the surface 12c of the lever 12, the lever will become disengaged from the cam 2d and will drop back to its initial position as shown in Fig. 3, the foot 12a being prevented from falling downwardly beyond the shown location by an abutment 12d at the left end of the lever 12, this abutment being adapted to contact a suitable stop for the frame 1b. When the foot 12a has been thus returned to its normal position, as shown in Fig. 3, the knife shank 11a will be free to fall back to its retracted position, and such falling action will be assisted by the pressure element 8 squeezing the top of the fruit downwardly as the cam wheel is further rotated and the lower end 9b of the arm is cranked downwardly to the lowest position thereof, at which time the maximum squeezing action is delivered by the pressure element 8 to the fruit F.

After the lower end of the arm 9b has been cranked to its lowest position by rotation of the cam wheel 2, the lower end of the arm 9b begins to rise again so that the press 8 begins to reciprocate upwardly from the pressing cup 5.

Near the lower end of the arm 9 I provide a throw-out pawl 9c, which pawl approaches a throw-out finger 7c, as shown in Figs. 4 and 8 as the lower end 9b of the arm begins to travel upwardly from its lowest position. Upon further rotation of the cam wheel, the press 8 is elevated until it has moved upwardly clear of the top of the cup 5, at which time the throw-out pawl 9c engages the throw-out finger 7c and causes the pivot rod 7 to rotate clockwise, as shown in Fig. 5, so that the cup 5 is moved from its closed position, shown in full lines, to its open position, shown in dotted lines in Fig. 5, such rotation of the pivot rod 7 simultaneously causing the bifurcated operator 7a, Fig. 6, to move to the left and thereby throw the toggle 13a of the switch leftwardly and open the electric circuit to the motor M. The throw-out finger 7c is so located on the pivot bar 7 that the opening of the switch 13 occurs at a time when the residual inertia of the system will cause the cam wheel 2 to continue rotating until it arrives and stops at its initial position, as shown in Fig. 3.

As shown in Figs. 3, 4, 5 and 7, the cup 5 is provided with a bottom plate 5a, which is hinged at 5b to the side walls of the cup 5, the hinges 5b being offset from the center of the bottom plate 5a so that the latter will gravitationally pivot downwardly, as shown in Fig. 7, and assume a dumping position when the cup is in its fully open position. Hence, whenever the cup is in open position, the bottom plate will be downwardly pivoted, and as the cup begins to approach its closed position, the bottom plate 5a will be pushed upwardly from the bottom by engaging the left edge 4d of the bowl 4, Fig. 7.

Note that after the throw-out pawl 9c has engaged the throw-out finger 7c to throw the cup to the open position at the same time turning off the switch 13, the aforementioned inertia of the motor and gear system causes the cam wheel 2 to continue rotating far enough so that the stud 2c will contact the closing finger 7b, Fig. 3, and return the cup 5 to a partially closed position, the cup returning far enough toward closed position so that the bottom plate 5a will contact the edge 4d of the bowl 4, Fig. 7, and return the bottom plate to horizontal position. When the mechanism comes to rest, the cup will remain in an intermediate position between closed and open but still sufficiently open so that the operator can place another charge of fruit in the cup before manually closing the cup by means of the knob 5c.

As shown in Figs. 4 and 5, the cup is provided with a pair of stops 5d fixed to the side walls of the cup and adapted to abut the bottom plate in its closed position to prevent the plate from passing upwardly into the cup beyond horizontal position. Also, the bottom plate 5a is provided with a pair of upwardly projecting members 5e, the members 5d and 5e being adapted to deflect the juice which strikes the members 5e into grooves in the bottom of the cup to prevent mixing of the juice with the peel oil of the fruit; also to prevent the carcass of the fruit from wedging between the bottom plate and a wall of the cup 5 in a manner which might impede the downward pivoting of the bottom plate when the cup 5 is moved into its fully open position.

As shown in Fig. 5, the bottom plate is provided with a set of crossed slots 5f, which slots are directly above the crossed blades of the knife 11 and are adapted to pass those blades as they are thrown upwardly to slit the fruit hull. In addition, I provide upwardly-standing teeth 5g in the bottom plate, which teeth impale the skin of the fruit as the pressure element 8 squeezes the fruit thereagainst so that the incisions made in the fruit by the knife 11 remain aligned with the slots 5f.

Below the cup 5 and inside of the bowl 4 is located an annular screen 14 having a hole in its center to receive the boss 4c. Suitable supporting means is provided to maintain the screen 14 level within the bowl and in addition I provide four upstanding pins 14a, Fig. 3, which pins are fixed to the screen and extend downwardly to rest on the bottom 4a of the bowl 4. The pins 14a also extend upwardly even with the top of the bowl 4 and lie below the four inner corners of the slots 5f in the bottom plate 5a. These pins 14a serve to lend additional support to the bottom plate 5a to prevent its being warped by the downwardly pressure of the pressure element 8 during the squeezing operation thereof.

In order to prevent the fruit juice from traveling downwardly in the bore of the boss 4c and down along the knife shank 11a, I provide a baffle 11b which is adapted to travel up and down with the knife shank 11a and deflect the flowing juice outwardly away from the boss 4c and the shank 11a.

When the cup 5 is in fully closed position above the bowl 4, as shown in Figs. 3 and 4, the small gap between the outer annular edge of the bottom plate 5a and the vertical side walls of the cup 5 is aligned over an annular oil groove 4e in top of the bowl 4. This annular groove 4e has a downspout 4f, Figs. 4, 7 and 8, through which the oil from the skin of the fruit is discharged into the hull receiving container H, it being important to understand that after the knife 11 has slit the bottom of the fruit and the pressure element 8 has squeezed the fruit downwardly against the bottom plate 5a, the skin of the fruit will seal tightly against the edges of the slots 5f so that the juice of the fruit will pass through said slots but so that the oil which is expressed from the skin of the fruit will not be able to pass between the skin and the edges of the slot 5f and therefore must drain from the cup through the annular space between the edge of the bottom plate 5a and the vertical sides of the cup 5.

The oil thence drops from this annular space into the oil groove 4e and passes downwardly through the downspout 4f into the hull container H, thereby separating the juice of the fruit from the skin oil thereof.

The lower face of the pressure element 8 is provided with a set of downwardly extending teeth 8a adapted to impale the skin of the fruit to prevent relative rotation of the fruit against the face of the pressure element 8 so as to insure that the fruit will remain properly centered in the cup 5 during the entire pressing operation, the teeth 8a also being adapted to strike the tops of the knife blades and depress same below the bottom of the cup to prevent the knife blades from interfering with the motion of the cup during the dumping operation.

To account for the fact that various sizes of fruit will be squeezed in this machine, I have provided a lost-motion connection between the upwardly-standing shank 8b of the pressure element 8 and the upper end of the arm 9. As the upper end of the arm 9 begins its downward travel and the pressure element 8 begins to meet with resistance against downward motion, the pin 9d will be permitted to travel downwardly within the slot 8c in the shank 9.

A pair of coil springs 8d and 8e surround the shank 8b and are so arranged that the lighter spring 8e will be partially compressed before the heavier spring 8d begins its compression. The upward slitting thrust of the knife 11 is timed to occur sometime during the interval of compression of the lighter spring 8e before the compression of the heavier spring 8d begins, the pressure of the lighter spring being intended merely to hold the fruit firmly in place during the slitting operation of the knife 11 so that the knife 11 will complete its operation just prior to the compression of the heavier spring 8d which actually performs the squeezing operation on the fruit.

As stated above, the collar 9a travels up and down on the guide 10 as the lower end 9b of the arm is cranked around by the cam wheel 2. The sleeve 9a, as it travels upwardly, is adapted to abut the washer 10b, which washer is normally urged downwardly by the spring 10c, the tension of the spring being controlled by the adjustment of the nut 10d. The spring loaded washer 10b bears against the sleeve 9a after the switch 13 has been turned off and during the inertia-driven actuation of the mechanism. Therefore, if the nut 10d is tightened the spring tension on the washer 10b is increased and the inertia driven coasting of the cam wheel 2 is arrested sooner. Conversely, if the nut 10d is loosened, the inertia coasting of the system is more weakly opposed and the cam wheel 2 will coast further. Thus, by adjustment of the nut 10b, the position in which the juicer will come to rest is determined.

*Operation*

When the machine is to be operated, a hull container H is placed on the machine beneath the spot where the cup 5 dumps the squeezed hulls, also beneath the oil downspout 4f. The operator places on the shelf S a tumbler or other container which is to receive the juice of the fruit, the tumbler abutting the arm 15a of the drip cup 15 and pushing the arm leftwardly, in Figs. 1 and 3, so that the tumbler then lies beneath the chute 4b to receive the juice, the drip cup 15 having been pivoted out of the way of the chute. This pivoting action also causes any drip which is collected in the drip cup 15 to be dumped into the tumbler.

With the receiving containers thus located in place, and with the squeezing cup 5 located in its initial intermediate position so that the bottom plate is being horizontally supported by the edge 4d of the bowl 4, the machine is ready for use. The operator inserts the fruit into the cup so that it rests on the bottom plate and is centered by the teeth 5g thereon. The operator then grasps the knob 5c and closes the cup 5, thereby rotating the pivot bar 7 until the bifurcated switch operator 7a closes the switch 13 and energizes the motor. Upon energizing of the motor, the cam wheel 2 begins to rotate clockwise, as shown in Fig. 3, and the stud 2c presses the closing finger 7b to the left, Fig. 3, until the cup 5 reaches its fully closed position. The cam wheel 2 continues further rotation, thereby lowering the lower end of the arm 9b so that the collar 9a slides downwardly along the guide 10, thereby causing the pin 9d at the upper end of the arm 9 to travel downwardly. The presser element 8 thereby contacts the fruit F and the lighter spring 8e provides sufficient pressure against the top of the fruit F to hold the fruit tightly positioned against the teeth 5g. At this time the cam 2d of the cam wheel 2 reaches the surface 12c on the lever 12, thereby suddenly raising the lever and causing the foot 12a to travel rapidly upwardly and raise the shank 11a, thereby raising the knives 11 through the slots 5f in the bottom plate 5a of the cup to cut the incisions in the bottom portion of the fruit. By the time the incision has been cut, the pin 9d at the top of the arm 9 has progressed downwardly to the point at which the heavier spring 8d starts to compress to force the pressure element 8 downwardly into the cup 5, thereby crushing the fruit F between the pressure element 8 and the bottom plate 5a.

As stated above, the fruit skin forms a seal against the edges of the slots 5f so that as the juice travels downwardly through the slot and into the bowl to the discharge chute 4b, any oil which is pressed from the skin of the fruit will not be permitted to pass into the slot 5f but must pass outwardly and downwardly through the annular space between the bottom plate 5a and the vertical sides of the cup 5. The oil thus passes into the oil slot 4e and downwardly through the downspout 4f into the hull container H.

After the lower end 9b of the arm 9 has passed through its lowest position on the cam wheel 2 and has begun to rise on the left side thereof and after the pressure element 8 has risen clear of the top of the cup 5, Fig. 3, the throw-out pawl 9c contacts the throw-out finger 7c and upon further rotation of the cam wheel 2 the pawl causes the finger to move clockwise to rotate the pivot bar 7 and throw the cup 5 outwardly over the hull container H. When the cup has reached its open position, the bottom plate 5a pivots downwardly and dumps the fruit hull into the hull container H, and the bifurcated operator 7a turns off the switch 13. The inertia of the mechanism causes the motor and the cam wheel 2 to continue rotation somewhat beyond the point at which the cup reaches its open position, so that the stud 2c contacts the closing finger 7b and returns the cup part way toward closed position and just far enough so that the bottom plate 5a is pressed upwardly by the edge 4d of the bowl 4 to resume its horizontal position. When the mechanism has come to a stop, the cup 5 is still sufficiently open so that the operator may then place another charge of fruit into the cup preparatory to starting the sequence of operation again by the manual moving of the cup toward a closed position employing the knob 5c.

It is important to note the cover plates 16 which not only protect the mechanism and give the device an attractive modern appearance, but serve the more important function of preventing injury to the operator's hands since the cup 5 must be in closed position before the motor M is energized. I have provided the cover with a plate 16a fixed to the cup 5 which plate 16a is closed tightly against the cover 16 when the squeezing operation is in progress, but which opens with the cup 5 to permit the easy insertion of a new charge of fruit.

I do not limit my invention to the exact forms shown in the drawings, for obviously changes may be made therein within the scope of the claims.

I claim:

1. In a machine for expressing juice from fruit hulls, said machine having a frame carrying a pressure element and having a juice receiving bowl therebelow; a fruit squeezing cup mounted on said frame for movement in a single plane from an open position to a closed squeezing position intermediate said pressure element and said bowl, said cup comprising sidewalls, and a bottom plate having apertures to pass the juice to the bowl, said plate being hinged off center to the side walls and the plate in closed position of the cup resting upon the top of the bowl whereby as the cup is moved to its open position clear of the bowl the bottom plate will pivot downwardly and dump the squeezed hull, and whereby as the cup is moved toward its closed position said bottom plate will be pushed upwardly by said bowl to resume a horizontal fruit receiving position, the bottom plate being supported by the bowl when the cup is in its closed position.

2. In a machine as set forth in claim 1, cover plates enclosing said frame, pressure element and bowl, said cover plates having a lateral opening intermediate said pressure element and said bowl to pass said cup as the latter moves between its open and its closed positions; and a cover fixed on said cup and movable therewith, said cover closing said opening when the cup is in its closed squeezing position.

3. In a machine as set forth in claim 1, the axis of said off-center hinge dividing said bottom plate into two portions, the larger portion pivoting downwardly and the smaller portion pivoting outwardly with respect to said cup when the latter is in open position, and said smaller portion having peripheral upstanding flange means between the hinges to prevent fruit hulls from jamming between said side walls and said plate and preventing the plate from freely pivoting.

4. In a machine for expressing juice from fruit hulls, said machine having a frame carrying a pressure element, having a juice receiving bowl therebelow and having power driven means for reciprocating said pressure element; a fruit squeezing cup mounted on a pivot bar journaled on said frame for moving said cup in a single plane from an open position to a closed squeezing position intermediate said pressure element and said bowl, said cup comprising sidewalls, and a bottom plate having apertures to pass the juice to the bowl, said plate being hinged off-center to the side walls whereby as the cup is moved to its open position clear of the bowl the bottom plate will pivot downwardly and dump the squeezed hull, and whereby as the cup is moved toward its closed position said bottom plate will be pushed upwardly by said bowl to resume a horizontal fruit receiving position, the bottom plate being supported by the bowl when the cup is in its closed position; and said pivot bar having lost motion means connecting it with said power driven means whereby said cup will be moved to closed position on the downstroke of said pressure element and be moved to open position on the upstroke of said pressure element.

5. In a machine as set forth in claim 4, quick-detach means for mounting said cup to said pivot bar.

6. In a machine as set forth in claim 4, the axis of said off-center hinge dividing said bottom plate into two portions, the larger portion pivoting downwardly and the smaller portion pivoting upwardly with respect to said cup when the latter is in open position, and said smaller portion having peripheral upstanding flange means between the hinges to prevent fruit hulls from jamming between said side walls and said plate and preventing the plate from freely pivoting.

7. In a machine as set forth in claim 4, cover plates enclosing said frame, pressure element and bowl, one of said cover plates having a lateral opening intermediate said pressure element and said bowl to pass said cup as the latter moves between its open and its closed positions; and an additional cover plate fixed on said cup and movable therewith, said latter cover plate closing said opening when the cup is in its closed squeezing position.

8. In a machine for expressing juice from fruit hulls, said machine having a frame carrying a motor drive, having a pressure element reciprocated by said drive, having a juice receiving bowl below said pressure element, and having a reciprocating set of knife blades projected upwardly intermittently from within said bowl by said drive; a fruit handling cup operated by said drive in a single plane to assume alternately an open dumping position and a closed expressing position intermediate said pressure element and said bowl, said cup comprising side walls; a bottom plate having juice slots through which said knife blades also reciprocate, said plate being hinged off-center to said side walls whereby as the cup moves to its open position said bottom plate will pivot to a substantially vertical orientation and dump the juiced hull, and whereby as the cup is moved toward closed position said bottom plate will be pushed upwardly by said bowl to resume a horizontal fruit receiving position, the bottom plate being supported by the bowl with said slots aligned above said knife blades when the cup is in closed position.

9. In a machine as set forth in claim 8, the axis of said off-center hinge dividing said bottom plate into two portions, the larger portion pivoting downwardly and the smaller portion pivoting upwardly with respect to said cup when the latter is in open position, and said smaller portion having peripheral upstanding flange means between the hinges to prevent fruit hulls from jamming between said side walls and said plate and preventing the plate from freely pivoting.

10. In a machine as set forth in claim 8, cover plates enclosing said frame, pressure element and bowl, said cover plates having a lateral opening intermediate said pressure element and said bowl to pass said cup as the latter moves between its open and its closed positions; and a cover fixed on said cup and movable therewith, said cover closing said opening when the cup is in its closed squeezing position.

11. In a machine for expressing juice from fruit hulls, said machine having a frame carrying a motor driven cam wheel, having a pressure element reciprocated by said wheel, having a juice receiving bowl below said pressure element, and having a reciprocating set of knife blades projected upwardly intermittently from within said bowl by said cam wheel; a fruit handling cup driven by said wheel to assume in a single plane alternately an open dumping position and a closed expressing position intermediate said pressure element and said bowl, said cup comprising side walls; a bottom plate having juice slots through which said knife blades also reciprocate, said plate being hinged off-center to said side walls whereby as the cup moves to its open position said bottom plate will pivot to a substantially vertical orientation and dump the juiced hull, and whereby as the cup is moved toward closed position said bottom plate will be pushed upwardly by said bowl to resume a horizontal fruit receiving position, the bottom plate being supported by the bowl with said slots aligned above said knife blades when the cup is in closed position.

12. In a machine as set forth in claim 11, said cup being supported by a pivot bar journaled in said frame, a motor control switch on said frame, an opening and a closing finger on said bar near said cam wheel; an operator on said bar engaging said switch; and cam means on said cam wheel whereby upon manual moving of said cup toward its closed position said operator will close said switch and said cam means will engage said closing finger to move said cup to its fully closed position to receive said pressure element and said blades, and whereby upon withdrawal of said pressure element said cam means will engage said opening finger to move said cup to its open dumping position, said operator opening said switch so that said cam wheel will stop in a position where said bottom plate will again contact said bowl and be returned to horizontal orientation, the cup stopping intermediate its open and closed positions.

13. In a machine as set forth in claim 12, a spring loaded abutment on said frame above said pressure element; and means to adjust the amount of spring pressure on said abutment whereby as said operator opens said switch said abutment will oppose the further retraction of said pressure element and thereby interpose resistance to the inertia coasting of said machine, the amount of resistance interposed being adjustable.

14. In a machine as set forth in claim 11, quick-detach means for mounting said cup to said pivot bar.

15. In a machine as set forth in claim 11, the axis of said off-center hinge dividing said bottom plate into two portions, the larger portion pivoting downwardly and the smaller portion pivoting upwardly with respect to said cup when the latter is in open position, and said smaller portion having peripheral upstanding flange means between the hinges to prevent fruit hulls from jamming between said side walls and said plate and preventing the plate from freely pivoting.

16. In a machine as set forth in claim 11, cover plates enclosing said frame, pressure element and bowl, one of said cover plates having a lateral opening intermediate said pressure element and said bowl to pass said cup as the latter moves between its open and its closed positions; and a cover plate fixed on said cup and movable therewith, said cover plate closing said opening when the cup is in its closed squeezing position.

17. A machine for expressing juice from fruit hulls, comprising a frame carrying a motor driven cam wheel; a pressure element reciprocated by said wheel; a juice receiving bowl below said pressure element; a reciprocating set of knife blades mounted on a shank slidably received within a slot in the bowl and adapted to be projected upwardly intermittently from within said bowl by said cam wheel; a fruit handling cup mounted on the frame and adapted to be pivoted in a horizontal plane by said wheel to assume in a single plane alternately an open dumping position and a closed expressing position intermediate said pressure element and said bowl, said cup comprising side walls; a bottom plate having juice slots through which said knife blades also reciprocate, said plate being hinged off-center to said side walls whereby as the cup moves to its open position said bottom plate will pivot to a substantially vertical orientation and dump a juiced hull, and whereby as the cup is moved toward closed position said bottom plate will be pushed upwardly by said bowl to resume a horizontal fruit receiving position, the bottom plate being supported by the bowl with said slots aligned above said knife blades when the cup is in closed position.

18. In a machine as set forth in claim 17, said cup being supported by a pivot bar journaled in said frame, a motor control switch on said frame, an opening and a closing finger on said bar near said cam wheel; an operator on said bar engaging said switch; and cam means on said cam wheel whereby upon manual moving of said cup toward its closed position said operator will close said switch and said cam means will engage said closing finger to move said cup to its fully closed position to receive said pressure element and said blades, and whereby upon withdrawal of said pressure element said cam means will engage said opening finger to move said cup to its open dumping position, said operator opening said switch so that said cam wheel will stop in a position where said bottom plate will again contact said bowl and be returned to horizontal orientation, the cup stopping intermediate its open and closed positions.

19. In a machine as set forth in claim 18, a spring loaded abutment on said frame above said pressure element; and means to adjust the amount of spring pressure on said abutment whereby as said operator opens said switch said abutment will oppose the further retraction of said pressure element and thereby interpose resistance to the inertia coasting of said machine, the amount of resistance interposed thereby being adjustable by said means.

20. In a machine as set forth in claim 19, said pressure element being supported on one end of a crank arm, and the other end of said arm being journaled off-set on said cam wheel; a guide bar fixed on said frame; a collar fixed near said first end of said arm and slidable on said guide bar; and said abutment comprising a coil spring surrounding said bar near the outer end of the latter to oppose the outward travel of said collar; and means for adjusting the pressure of said spring on said collar, said pressure being effective against said collar only near the fully retracted position of said pressure element.

References Cited in the file of this patent

UNITED STATES PATENTS

| | | |
|---|---|---|
| 1,768,534 | Aiken | July 1, 1930 |
| 1,855,221 | Burkholder et al. | Apr. 26, 1932 |
| 1,891,003 | McFarlin | Dec. 13, 1932 |
| 2,363,798 | McCulloch | Nov. 28, 1944 |